United States Patent [19]

Uematsu et al.

[11] Patent Number: 4,914,950
[45] Date of Patent: Apr. 10, 1990

[54] CERAMIC CONDUIT ASSEMBLY WITH METAL OUTER TUBE

[75] Inventors: Ikuo Uematsu; Masao Fukunaga, both of Katsuta; Akiomi Kohno, Ibaraki, all of Japan

[73] Assignee: Hitachi, Ltd., Tokyo, Japan

[21] Appl. No.: 259,321

[22] Filed: Oct. 18, 1988

[30] Foreign Application Priority Data

Oct. 23, 1987 [JP] Japan ............................. 62-267757

[51] Int. Cl.⁴ ............................................. G01F 1/58
[52] U.S. Cl. .................................................. 73/861.12
[58] Field of Search ....................... 73/861.12, 861.11; 310/11

[56] References Cited

U.S. PATENT DOCUMENTS

| | | | |
|---|---|---|---|
| 4,507,975 | 4/1985 | Bittner et al. | 73/861.12 |
| 4,614,121 | 9/1986 | Hansen et al. | 73/861.12 |
| 4,641,536 | 2/1987 | Jacobsen et al. | 73/861.12 |
| 4,699,310 | 10/1987 | Kohno et al. | 228/122 |

FOREIGN PATENT DOCUMENTS 52-145420 3/1977 Japan .
61-124823 12/1986 Japan .

*Primary Examiner*—Charles A. Ruehl
*Attorney, Agent, or Firm*—Antonelli, Terry & Wands

[57] ABSTRACT

A ceramic conduit with a metal outer tube is joined to bonding rings through insert members between end surfaces of the rings and annular bonding surfaces, with the annular bonding surface being not parallel to the axis of the conduit and the insert member being bonded to the ring and conduit. The rings are joined to the outer tube through welds between forward ends of annular protrusions provided in end surfaces which are the reverse surfaces of the surface bonded with the insert members and the forward ends of annular protrusions provided in axial end surfaces of the outer tube. The inner periphery of the outer tube is fitted on the outer periphery of the conduit with a small gap therebetween. The rings are bonded to the conduit with the insert members by being pressed against the conduit in the axial direction of the conduit and only a small quantity of heat is transmitted from the welds to other portions. The outer tube is joined to the rings through portions having a low rigidity to achieve a highly reliable metal and ceramic bonding is achieved and the bonded surfaces are not deteriorated by the welding nor is the outer tube deformed by the welding heat, and an external load is not substantially transmitted to the bonded surfaces.

12 Claims, 3 Drawing Sheets

CERAMIC CONDUIT ASSEMBLY WITH METAL OUTER TUBE

BACKGROUND OF THE INVENTION

1. Field of the Invention

The present invention relates to a ceramic conduit assembly with a metal outer tube, and, more particularly, to a ceramic conduit assembly with a metal outer tube which is suitable for use in an industrial sensor such as, for example an electromagnetic flowmeter.

2. Description of the Related Art

While there have been a number of conventional techniques proposed for joining a ceramic conduit to a metal outer tube, each of the proposed conventional techniques have one or more problems.

In, for example, conventional mechanical methods such as, for example, shrink fitting, machining accuracies of the ceramic conduit and the metal outer tube for a constant interference are required. Furthermore, necessary assembly work must be completed quickly under high temperature conditions of between 300° C. and 600° C., thereby decreasing productivity. Moreover, changes in the working temperature within the accepted tolerance produce a space between the two members thereby lowering the air tightness of a magnetic circuit housing portion.

In, for example, mechanical methods employing an O-ring, not only are the above-mentioned machining accuracies required but changes in the working temperature leads to a deterioration of the O-ring thereby lowering the air tightness.

Conventional bonding methods using, for example, an organic or inorganic adhesive suffer from the same problems relating to deterioration due to changes in working temperature so that the strength and air tightness of the joint portions which depend upon the adhesive strength and adhesive used are adversely affected.

In conventional methods such, as for example, metallizing, complicated preparatory work must be undertaken prior to the joining process and complicated joining processes are also required, with the joining strength depending upon the bond strength of the material metallized on the ceramic surface, which bonding strength is generally weak.

Conventional electromagnetic flow meters having a ceramic conduit are disclosed in, for example, Japanese Patent Laid-Open No. 61-124,823; with this technical concept being based on the configurations of the ceramic conduit and outer tube; however, this proposed construction does not take into account any stress exerted on the joint portion between the conduit and the metal outer tube which stress would be caused by concentrated loads applied to the outer tube or low cycle fatigue caused by the temperature or pressure variations. A further disadvantage resides in the fact that a magnetic circuit housing portion thereof has poor air tightness at high temperatures or under high pressure.

In, for example, U.S. Pat. No. 4,699,310, a method for bonding a ceramic with a metal is proposed which employs a member composed of an Al alloy or pure Al as a core and an Al-Si alloy cladded on both surfaces of the core, and the member is inserted between the ceramic and the metal and is welded to both the ceramic and the metal. However, in a case where a metal outer tube is fitted on an outer peripheral portion of a ceramic conduit and is joined to the ceramic conduit, it is difficult to prevent the thermal stress that is caused by the difference in the coefficients of linear expansion between the ceramic and metal, and external loads applied to the metal outer tube from being exerted on the bonded portions. In addition, it is also difficult to apply an adequate pressing force on the fitting surfaces between the outer tube and the conduit when the conduit is joined to the outer tube through the insert members. Therefore, some problems remain regarding the joining of the ceramic conduit and the metal outer tube fitted on the outer peripheral portion of the conduit, although the technique itself is valuable as a bonding method.

SUMMARY OF THE INVENTION

Accordingly, an object of the present invention is to provide a ceramic conduit assembly with a metal outer tube, which has a joining portion between the metal outer tube and a ceramic conduit, with the joining portion having high strength and airtightness, and being highly reliable against external loads applied to the outer tube, thermal stress caused by changes in the working temperature, and deformation caused by the internal pressure within the conduit.

In accordance with advantageous features of the present invention, a ceramic conduit assembly is provided wherein a ceramic conduit has outer fitting peripheral portions respectively provided at two longitudinal ends of the outer peripheral portion of the conduit, and annular bonding surfaces respectively arranged along the outer peripheral fitting portions, with the annular bonding surfaces extending in a direction not parallel to the longitudinal axis of the ceramic conduit. Two metal bonding rings are provided with each bonding ring having a bonding end surface which has a configuration corresponding to the annular bonding surface of the ceramic conduit. The bonding ring is provided with an outer peripheral fitting surface, an outer end surface which is the reserve surface of the bonding end surface, and an annular protrusion is provided along the outer peripheral fitting surface of the bonding ring, with the annular protrusion of the bonding ring protruding from the outer end surface. A metal outer tube is provided having a first outer tube in a peripheral fitting portion which is fitted on the outer peripheral fitting portion of the conduit, with a second outer tube inner peripheral fitting portion being fitted on the outer peripheral fitting surface of the bonding ring. Two outer tube end surfaces and two outer tube annular protrusions are provided along the outer tube in a peripheral fitting portion, with the outer tube annular protrusions respectively protruding from the outer tube end surfaces. The metal outer tube is joined to the bonding rings through welded portions arranged at the longitudinal outer ends of the fitted portions formed between the outer tube annular protrusions and the bonding ring annular protrusions. Two insert members are respectively inserted between the annular bonding surface of the conduit and the bonding end surface of the bonding ring, with the insert members being respectively welded to both of the annular bonding surface of the conduit and the bonding end surface of the bonding ring so that the conduit and the bonding ring are bonded to each other.

One advantage to the present invention resides in the fact that when the outer tube is attached to the ceramic conduit through the bonding rings and insert members, the bonding rings are pressed against the ceramic conduit through the insert members not in the radial direction but in an axial direction of the conduit thereby allowing the pressing force to be applied constantly on the bonded surfaces between the bonding ring and the insert member and between the conduit and the insert member. If the ceramic conduit is bonded to the metal outer tube directly through the insert members interposed therebetween without using bonding rings, or if the bonding rings are bonded to the outer periphery of the ceramic conduit through the insert members interposed therebetween, it is very difficult to provide a sufficient uniform pressing force on the bonded surfaces because it is difficult to apply a sufficient uniform pressing force on the cylindrical fitting surfaces in the radial direction through the insert members. Sufficient and uniform pressing forces that press the insert members against the bonded surfaces insure an increased bonding strength of the bonded portions and an improved air tightness thereof. Therefore, bonded portions which have an increased bonding strength and an improved air tightness are provided by using the bonding rings which are bonded to the ceramic conduit through the insert members by being pressed against the conduit not in the radial direction but in the axial direction of the ceramic conduit.

In the present invention, the bonding rings joined to the ceramic conduit are joined to the metal outer tube by welding and the end of the annular protrusions of the bonding rings are connected with the end of the annular outer tube protrusions thereby providing a number of advantages in comparison with the bonding method in which the bonding rings are welded to the outer tube without the provision of protrusions.

More particularly, since welding is done in a portion having a small volume, the quantity of heat that diffuses to a portion other than the welded portion is small so that the quantity of heat required for welding is small. This allows deformation of the components constituting the assembly as well as the adverse effect of the welding heat for the insert members to be diminished.

Furthermore, since the rigidity of the protrusions is small, when an external load is applied to the outer tube, the external load is not transmitted to the conduit only through the insert materials but also through the contact portions between the inner peripheral fitting portion of the outer tube and the outer peripheral fitting portions of the conduit. Thus, it is possible to provide high reliable bonded portions.

The above and other objects, features, and advantages of the present invention will become more apparent from the following description when taken in connection with the accompanying drawings which show, for the purpose of illustration only, several embodiments in accordance with the present invention.

BRIEF DESCRIPTION OF THE DRAWINGS

FIG. 1b is a side elevational view of the electromagnetic flowmeter of FIG. 1a;

DETAILED DESCRIPTION OF THE PREFERRED EMBODIMENTS

Figure 1B:
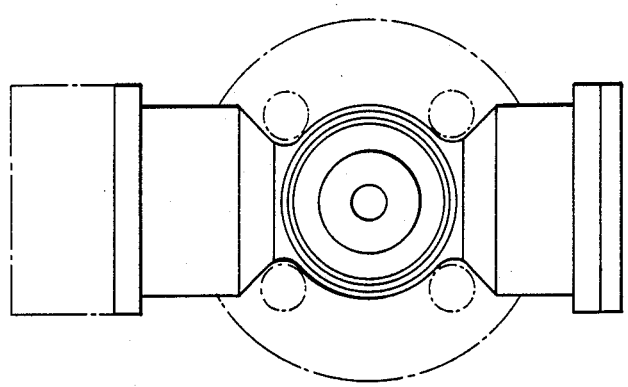
Figure 1A:
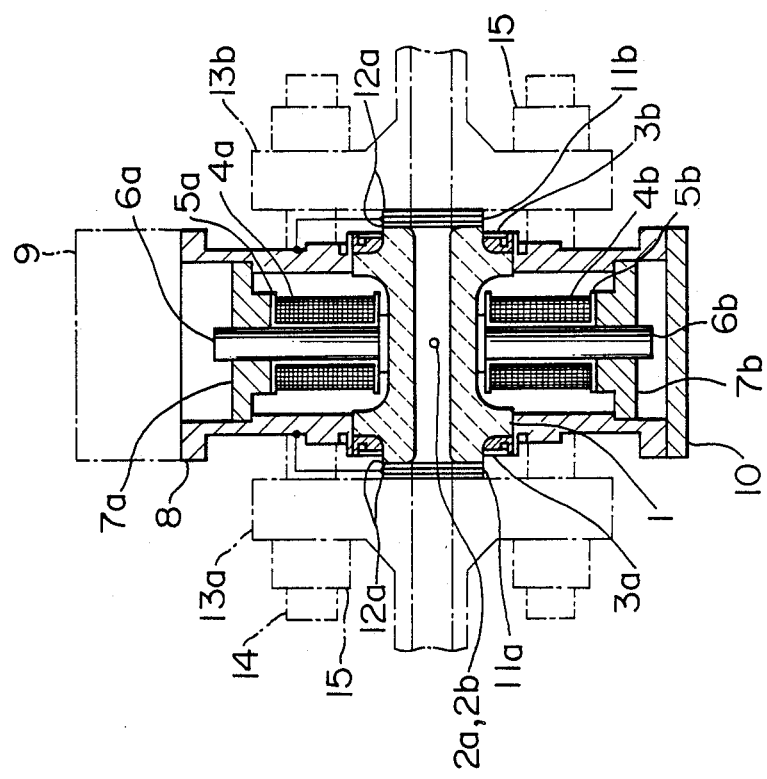
FIG. 1a is longitudinal cross-sectional view of an electromagnetic flowmeter employing a ceramic conduit assembly with a metal outer tube according to the present invention.
Figure 2A:
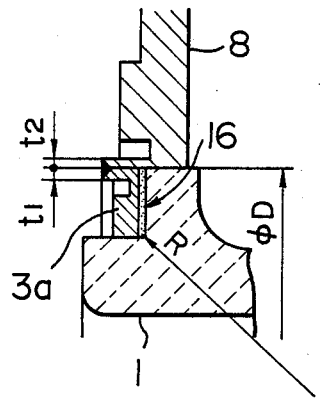
FIG. 2a shows an example of the bonded portions.
Figure 2B:
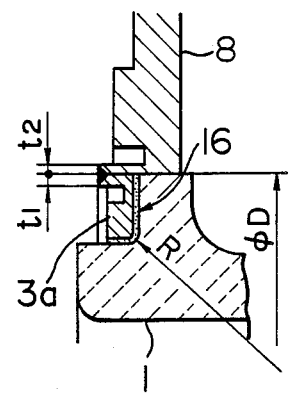
FIG. 2b shows another example of the bonded portions.
Figure 2C:
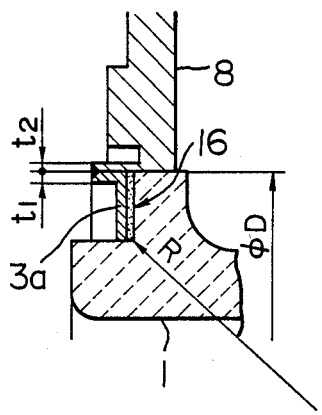
FIG. 2c shows a third example of the bonded portions.
Figure 2D:
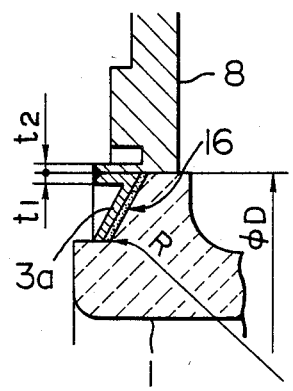
FIG. 2d shows a fourth example of the bonded portions.

Referring now to the drawings wherein like reference numerals are used throughout the various view to designate like parts and, more particularly, to FIGS. 1(a-b) and 2(a-d), according to these figures, in a ceramic conduit assembly with an intake outer tube applied to an electromagnetic flow meter, in order to allow a high temperature, corrosive or slurry fluid to flow through a conduit, the conduit 1 is made of a ceramic such as $Al_2O_3$, and has an inner diameter of 12 mm, a length of 48 mm and an outer diameter of 41.95 mm. Flanges 13a and 13b that communicate with pipeline are respectively tightened by bolts 14 and nuts 15 to the two longitudinal ends of the conduit 1. Earth rings 11a and 11b, made of a conductive material, and gaskets 12a and 12b are respectively interposed between the end surfaces of the flanges 13a and 13b and the two longitudinal ends of the conduit 1. The earth rings 11a and 11b are grounded to ground the fluid that flows within the conduit and to reduce the noise level, with the gaskets 12a and 12b preventing fluid leakage. Annular bonding surfaces 36 having a rising flange structure and an outer diameter of 41.95 mm and an inner diameter of 32 mm are disposed between the longitudinal ends of the conduit 1, so that the annular bonding surfaces are located between the surfaces where the conduit 1 is coupled with the pipeline. The annular bonding surface 36 may extend perpendicular to the axis of the conduit, as shown in FIGS. 1a, 1b and 2a, or may extend slantingly, as shown in FIg. 2d. Electrodes 2a and 2b made of platinum are buried in the ceramic conduit, with forward ends of the electrodes 2a, 2b extending into the conduit 1 in such a manner that an axis of the electrodes 2a, 2b is perpendicular to the axis of the conduit 1.

Bonding rings 3a and 3b are respectively joined to the annular bonding surfaces through insert members 16 disposed therebetween. The joining process which uses the insert members 16 will be described later. The joined portions between the bonding rings 3a and 3b and the conduit 1 have any of the configurations shown in FIGS. 2a to 2d. In the structure shown in FIG. 2a, the inner diameter 32 of the bonding ring 3a or 3b is fitted on a smaller outer diameter 31 cylindrical portion of the conduit 1 which portion extends from the inner diameter portion of the annular bonding surface to the longitudinal end of the conduit 1, so that the axes of the two members are aligned with each other. The insert members 16 are inserted between one of the end surfaces of the bonding ring 3a or 3b and the annular bonding surface and is bonded to both the bonding ring 3a or 3b and the conduit 1. The bonding ring 3a or 3b has a width of 3 mm, an outer diameter of 41.9 mm, and an inner diameter of 32 mm. A groove having an outer diameter 34 of 40 mm, an inner diameter 35 of 38 mm and a depth of 2 mm is formed in an end surface of the bonding ring 3a or 3b, which surface is the reverse surface of the surface joined to the annular bonding surface. In this structure, since the inner diameter of the bonding ring 3a is fitted on the smaller diameter cylindrical portion of the conduit 1, it is easy to align the axes of the two members. It is also easy to press the insert members 16 sufficiently and uniformly in the axial direction of the conduit. In the structure shown in FIG. 2b, the insert member 16 is inserted not only between the end surface of the bonding ring 3a or 3b and the annular bonding surface but also between the smaller outer diameter cylindrical portion of the conduit 1 and the inner diameter portion of the bonding ring 3a or 3b, and is bonded to both of them. The bonding ring employed is this example has the same form as that used in the structure shown in FIg. 2a with the exception that the inner diameter of the bonding ring 3a or 3b larger by a value equivalent to a double thickness of the insert member 16. In this structure, whereas an increased bonding strength is ensured due to an increase in the bonding areas between the bonding ring 3a or 3b and the conduit 1, it is practically difficult to press the insert member 16 sufficiently and uniformly. Further, a jig is required to align the axis of the bonding ring 3a or 3b with that of the conduit 1. The structure shown in FIG. 2c employs an L-shaped bonding ring 3a or 3b. In addition to the advantages which are carried out by the structure shown in FIG. 2a, this structural example has an advantage involving the ease of manufacture of the bonding ring. In the structure shown in FIG. 2d, the annular bonding surface extends not perpendicular to the axis of the conduit, but obliquely with respect thereto. In this example, the insert member 16 can be pressed with a larger force in comparison with the examples shown in FIGS. 2a to 2c. However, since it is difficult to manufacture a bonding ring 3a or 3b having a slanting end surface which correctly corresponds with the shape of the annular bonding surface and to manufacture a hollow insert member having a correct truncated conical from, production cost increases. Therefore, uniform pressing on the insert member 16 is also difficult. In any of the bonding structures shown in FIGS. 2a to 2d, it is preferable for the outer diameter of the bonding ring 3a or 3b to be smaller than that of the ceramic conduit by about 0.05 mm. Preferably, the bonding ring 3a or 3b is made of the same material as that of which the metal outer tube is made, from the viewpoint of weldability. The conduit 1 has a rising flange structure. The distance between the annular bonding surface and the longitudinal end surface of the conduit 1 which is coupled to the pipeline is larger than the sum of the width of the bonding ring 3a or 3b and the thickness of the insert member 16, so that the bonding portions between the bonding ring 3a or 3b and the conduit 1 are not affected by the connection with the pipeline.

The metal outer tube 8 has an inner peripheral portion having a diameter of 42 mm. The inner peripheral portion of the metal outer tube 8 is fitted on the outer peripheral portion of the conduit 1 with a gap of 0.05 mm. As stated above, since the outer diameter of the bonding ring 3a or 3b is smaller than that of the ceramic conduit 1 by 0.05 mm, the outer diameter of the bonding ring 3a or 3b is smaller than the diameter of the inner peripheral portion of the outer tube 8 by 0.1 mm. The axial width of the outer tube 8 is substantially equal to the distance between the two grooved end surfaces of the bonding rings 3a, 3b bonded to the annular bonding surfaces of the conduit 1 through the insert members 16. A groove having an inner diameter of 44 mm, an outer diameter of 46 mm, and a depth of 2 mm is formed in each of the two axial end surfaces of the outer tube 8. Alternatively, an annular protrusion having a thickness of 1 mm and a length of 2 mm may be formed in place of the groove. The longitudinal outer ends 30 (FIGS. 2a-2d) of the fitted surfaces between the outer tube 8 and the bonding rings 3a and 3b are welded so as to join the outer tube 8 with the bonding rings 3a, 3b. Preferably, they may be welded by a depth of about 1 mm from the end surface by inert-gas tungsten arc welding or electron beam welding. Since the forward ends of the protrusions formed on the bonding rings 3a and 3b and on the outer tube 8 are welded, a reduced quantity of heat is transmitted from the welded portions to the bodies of the bonding rings and the outer tube, and heating of the welded portions requires a minimum quantity of heat. This diminishes the deformation occurring in the bonding ring 3a or 3b and the outer tube 8 by the thermal stress, as well as the deterioration occurring in the bonded portions of the insert members 16 by the heat. Further, an increase in the stress exerted on the bonded portions between the outer tube 8 and the bonding rings 3a, 3b which is caused by the displacement between the conduit 1 and the outer tube 8 is restricted because of the small flexural rigidity of the protrusions. Moreover, since the outer tube 8 is fitted on the conduit 1 with a gap of 0.05 mm therebetween while the outer tube 8 is fitted on the bonding rings 3a and 3b with a gap of 0.1 mm therebetween, when an external force is exerted on the outer tube 8, the inner peripheral portion of the outer tube 8 contacts with the outer peripheral portion of the conduit 1 but does not contact the bonding rings 3a and 3b. Since the displacement between the outer tube 8 and the bonding rings 3a, 3b does not increase after the outer tube 8 has been in contact with the conduit 1, and since the outer tube 8 and the bonding rings 3a, 3b are not in contact with each other, the stress exerted on the bonded portions between the conduit 1 and the bonding rings 3a, 3b does not increase after the contact. Thus, since the protrusions have a small flexural rigidity and since the gap between the outer tube and the bonding rings 3a, 3b is larger than that between the outer tube 8 and the conduit 1; the stress exerted on the bonded portions can be kept at a low standard value or less, and the external force applied to the outer tube 8 is carried by the contact portion between the outer tube 8 and the conduit 1. In order that the fluid which flows between the pair of electrodes 2a, 2b provided in the conduit 1 is set within a magnetic field which extends in the direction perpendicular to the axis of the electrodes 2a, 2b and to that of the conduit 1, the outer tube 8 receives exciting coils 4a and 4b, bobbins 5a and 5b, magnetic poles 6a and 6b, and auxiliary yokes 7a and 7b. Further, a waterproofing casing 9 for receiving the electrical wiring and electric circuits as well as a lid 10 for covering the coil receiving portion are also fixed to the outer tube 8. Although any material having both of good weldability and high permeability is used to form the outer tube 8, the outer tube 8 is made of SC 42 in this embodiment.

Figure 3:
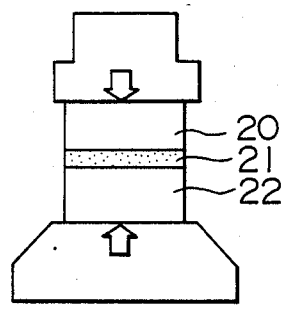
FIG. 3 schematically illustrates a solid phase bonding process.
Figure 4:
FIG. 4 is a schematic view of an Al inserted material.

The bonding rings 3a, 3b are joined to the ceramic conduit 1 through the insert members 16 being disposed therebetween in the manner described below. The insert member 16 used in this embodiment is a clad plate composed of a pure Al thin plate having a thickness of 0.5 mm, and two Al-10% Si alloy thin plates having a thickness of 0.05 mm, the Al-10% Si allow plates being clad on the surface of the pure Al plate. The thickness of the insert member 16 is therefore 0.6 mm. The thickness of the insert member 16 is selected to within a range of between 0.6 mm and 2 mm, depending on the size of the conduit 1. The clad plate is formed as the insert member 16 into an annular form having an inner diameter of 32.1 mm and an outer diameter of 41.5 mm by press working or machining. The inner peripheral portion of the machined inserted member 16 is fitted on each of the smaller outer diameter cylindrical portions of the conduit 1, and the insert member 16 is then placed on the annular bonding surface of the conduit 1. Subsequently, the inner peripheral portion of the bonding ring 3a or 3b is fitted on the smaller outer diameter cylindrical portion of the conduit 1, and the bonding ring 3a or 3b is then placed on the insert member 16 such that the insert member 16 is placed between the bonding end surface of the bonding ring 3a or 3b and the annular bonding surface of the conduit 1. Thereafter, the assembly including the insert members 16, the bonding rings 3a, 3b and the conduit 1 is placed in a heating furnace which is evacuated or contains inactive gas such as Ar or $N_2$, and is heated up to about 600° C. In the heating furnace a pressing force between 0.5 kgf and 1.0 kgf/mm$^2$ acts on the bonded portions between the bonding rings 3a, 3b and the insert members 16 and between the conduit 1 and the insert members 16 for 10 to 30 minutes, as shown in FIG. 3. In FIG. 3, the reference numerals of 20, 21, and 22 respectively designate ceramic insert member and metal. At this heating temperature, the pure Al layer of the insert member does not melt while the Al-10% Si layer melts, and this difference in the melting temperatures prevents all the melted insert material from flowing out from the bonded portions, so that a reduction in the thickness of the insert member is limited. Since the thickness of the insert member is maintained by the pure Al layer, the thermal stress generated by the difference between the heating temperature and the working temperature and by the difference in the coefficients of the linear expansion between the bonding ring 3a, 3b and the conduit 1 is absorbed by the plastic deformation of the insert member, so that the amount of residual stress caused by bonding is decreased. Further, since Al has a lower elastic coefficient that those of a ceramic and steel and since the thicknees of the insert member is maintained, stress concentration which is generated at the bonding portion by the thermal stress or by the external load applied during use can also be dinimished. The above-described bonding method is applied not only to the bonding of the oxide ceramics such as $Al_2O_3$ but also to that of non-oxide ceramics such as silicon dioxide, silicon carbide or sialon. In case the ceramic is alumina the bonded surfaces obtained in the above-described manner maintains a flexural strength of 15-20 kgf/mm$^2$ and an airtightness of He leaking rate less than $10^{-8}$ Torr. l/s at the ambient temperature of 300° C.

The insert member may be made of the other clad plate which is composed of the surface layers made of pure Al or Al alloy and the core plate made of Ti, Wc-Co Hr, Ta or Nb whose melting temperature are higher than that of the surface layers. Insert members of this type are disclosed in, for example, Japanese Unexamined Patent Publication No. 60-101,236. Further, the insert member may be made of In-Sn alloy as disclosed, for example, in Japanese Unexamined Patent Publication No. 62-40388.

Figure 5:
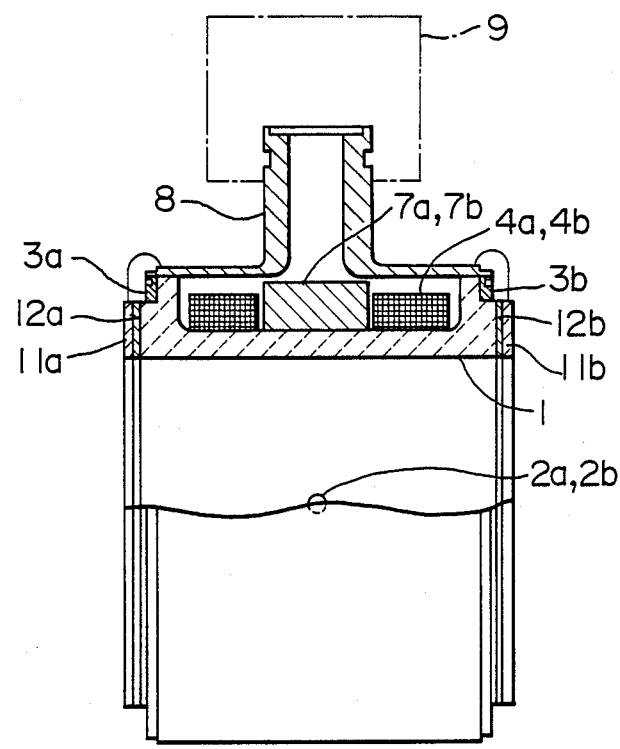
FIG. 5 is a longitudinal cross-sectional view of portions of another example of the electromagnetic flowmeter employing the ceramic conduit assembly with the metal outer tube according to the present invention.

FIG. 5 shows another embodiment of the present invention, with the electromagnetic flowmeter shown in FIG. 5 having similar structure to that employed in the first embodiment with the exception that protrusions are provided in the vicinity of the welded portions at the longitudinal ends of the outer tube in place of the grooves; however, the same bonding method as that of the first embodiment is used.

What is claimed is:

1. A ceramic conduit assembly with a metal outer tube, the ceramic conduit assembly comprising:

a ceramic conduit having outer peripheral fitting portions respectively provided at two longitudinal ends of an outer peripheral portion of said conduit, and annular bonding surfaces respectively arranged along said outer peripheral fitting portions, said annular bonding surfaces extending in a direction which is not parallel to a longitudinal axis of said ceramic conduit;

two metal bonding rings each having a bonding end surface which has a configuration corresponding to said annular bonding surface of said ceramic conduit, an outer peripheral fitting surface, an outer end surface which is a reverse surface of said bonding end surface, and an annular protrusion provided along said outer peripheral fitting surface, said annular protrusion of the bonding ring protruding from said outer end surface; conduit, second inner peripheral fitting portions which are fitted on said outer peripheral fitting surfaces of said bonding ring, two outer tube end surfaces, and two annular protrusions provided along said second inner peripheral fitting portions, said annular protrusions of said outer tube respectively protruding from said outer tube end surfaces, said metal outer tube being joined to said bonding rings through welded portions arranged at the longitudinal outer ends of fitted portions formed between said annular outer tube protrusions and said annular protrusions of said bonding ring, said metal outer tube including a coil, auxiliary yolks, bobbins and cores which generate a magnetic field which extends in a direction perpendicular to both of the longitudinal axis of said conduit and the longitudinal axis of said pair of electrodes provided in said conduit and which passes between said pair of electrodes; and two insert members, each being inserted between said annular bonding surface of the conduit and said bonding end surface of said bonding ring, said insert members being welded to both of said annular bonding surfaces of said conduit and said bonding end surfaces of said bonding rings so that said conduit and said bonding rings are bonded to each other.

2. A ceramic conduit assembly with a metal outer tube according to claim 1, wherein said insert member is made of a material which is softer than a material of said bonding ring.

3. A ceramic conduit assembly with a metal outer tube according to claim 1, wherein a gap between said bonding ring and said metal outer tube is larger than a gap between said ceramic conduit and said metal outer tube.

4. A ceramic conduit assembly with a metal outer tube according to claim 1, wherein said annular bonding surfaces of said conduit are located between the end surfaces at which said conduit is coupled to pipe lines and a distance between said annular bonding surface of said conduit and said end surface to be coupled is larger than a sum of widths of said insert member and said bonding ring.

5. A ceramic conduit assembly with a metal outer tube according to claim 1, wherein said insert member has a three-layer structure composed of a core layer made of pure Al and two surface layers made of Al-10% Si alloy, and said surface kayers are clad on said core layer.

6. A ceramic conduit assembly with a metal outer tube according to claim 1, wherein said ceramic conduit has smaller outer diameter cylindrical portions respectively extending from the inner diameters of said annular bonding surface of said conduit to the end surfaces at which said conduit is coupled to the pipeline, each of said smaller outer diameter cylindrical portions being fitted to the inner peripheral portion of said bonding ring.

7. An electromagnetic flow meter comprising:
a ceramic conduit having outer peripheral fitting portions respectively provided at two longitudinal ends of an outer peripheral portion of said conduit, and annular bonding surfaces disposed along said outer peripheral fitting portions, said annular bonding surfaces extending in a direction which is not parallel to longitudinal axis of said ceramic conduit, said conduit including a pair of electrodes which extend from an outside of said conduit to an inner periphery thereof in such a manner that a longitudinal axis of said electrodes is perpendicular to the longitudinal axis of said conduit;

two bonding rings, each having a bonding end surface which is has a configuration corresponding to said annular bonding surface of said ceramic conduit, an outer peripheral fitting surface, an outer end surface which is a reverse surface of said bonding end surface, and a bonding ring annular protrusion provided along said outer peripheral fitting surface of the bonding ring, said annular protrusion of the bonding ring protruding from said outer end surface;

a metal outer tube having a first inner peripheral fitting portion which is fitted on said outer peripheral fitting portion of said a metal outer tube having a first inner peripheral fitting portion which is fitted on said outer peripheral fitting portion of the conduit, second inner peripheral fitting portions which are fitted on said outer peripheral fitting surfaces of said bonding ring, two outer tube end surfaces, and two annular protrusions provided along said second inner peripheral fitting portions of said outer tube, said annular protrusions of said outer tube respectively protruding from said outer tube and surfaces, said metal outer tube being joined to said bonding rings through welded portions arranged at the longitudinal outer ends of fitted portions formed between said annular protrusions of said outer tube and said annular protrusions of the bonding ring; and two insert members, each being inserted between said annular bonding surface of said conduit and said bonding end surface of said bonding ring, said insert members being welded to both of said annular bonding surfaces of said conduit and said bonding end surfaces of said bonding rings so that said conduit and said bonding rings are bonded to each other.

8. An electromagnetic flowmeter according to claim 7, wherein said insert member is made of a material which is softer than a material of said bonding ring.

9. An electromagnetic flowmeter according to claim 7, wherein a gap between said bonding ring and said metal outer tube is larger than a gap between said ceramic conduit and said metal outer tube.

10. An electromagnetic flow meter according to claim 7, wherein said annular bonding surfaces of the conduit are located between the end surfaces at which said conduit is coupled to pipe lines and a distance between said annular bonding surface of the conduit and said end surface to be coupled is larger than a sum of the widths of said insert member and said bonding ring.

11. An electromagnetic flowmeter according to claim 7, wherein said insert member has a three-layer structure composed of a core layer made of pure Al and two surface layers made of Al-10% Si alloy, and said surface layers are clad on said core layer.

12. An electromagnetic flowmeter according to claim 7, wherein said ceramic conduit has smaller outer diameter cylindrical portions respectively extending from the inner diameters of said annular bonding surfaces of the conduit to the end surfaces at which said conduit is coupled to pipeline, each of said smaller outer diameter cylindrical portions being fitted to the inner peripheral portion of said bonding ring.

* * * * *